(12) United States Patent
Bondu

(10) Patent No.: US 9,162,537 B2
(45) Date of Patent: Oct. 20, 2015

(54) TIRE BEAD FOR HEAVY CIVIL ENGINEERING VEHICLE

(75) Inventor: Lucien Bondu, La Roche Noire (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 124 days.

(21) Appl. No.: 13/516,594

(22) PCT Filed: Dec. 7, 2010

(86) PCT No.: PCT/EP2010/069080
§ 371 (c)(1),
(2), (4) Date: Aug. 14, 2012

(87) PCT Pub. No.: WO2011/073058
PCT Pub. Date: Jun. 23, 2011

(65) Prior Publication Data
US 2012/0305161 A1  Dec. 6, 2012

(30) Foreign Application Priority Data

Dec. 15, 2009 (FR) ...................... 09 58993

(51) Int. Cl.
*B60C 15/00* (2006.01)
*B60C 15/06* (2006.01)
(52) U.S. Cl.
CPC .............. *B60C 15/06* (2013.01); *B60C 15/0628* (2013.04); *B60C 2015/065* (2013.04); *B60C 2015/0642* (2013.04); *B60C 2200/06* (2013.04)

(58) Field of Classification Search
CPC ...... B60C 15/00; B60C 15/06; B60C 15/0628
See application file for complete search history.

(56) References Cited

U.S. PATENT DOCUMENTS

| 3,941,177 | A | | 3/1976 | Okada et al. |
| 4,947,638 | A | * | 8/1990 | Nagamine et al. ............ 57/212 |
| 6,427,743 | B1 | | 8/2002 | Ueyoko et al. |

FOREIGN PATENT DOCUMENTS

| FR | 2 901 178 | | 11/2007 |
| FR | 2 928 104 | | 9/2009 |
| GB | 1241633 | * | 8/1971 |
| GB | 1392481 | * | 4/1975 |

(Continued)

OTHER PUBLICATIONS

Machine translation of JP 2000-85319, 2000.*

(Continued)

*Primary Examiner* — Justin Fischer
(74) *Attorney, Agent, or Firm* — Cozen O'Connor

(57) ABSTRACT

Technique for improving the endurance of beads of a radial tire for a heavy vehicle of the civil engineering type, by blocking the cracks that are initiated in the carcass reinforcement upturn end zone and that are propagated in the surrounding polymer materials, causing the deterioration of the bead over time. A binding element (23), having at least two layers of binding including reinforcement elements made of textile material, is in continuous contact with the carcass reinforcement upturn (211) between a first point of contact (A2) on the axially inner face (211a) of carcass reinforcement upturn, corresponding to a first end (I2) of the binding element, and a last point of contact (B2) on the axially outer face (211b) of the carcass reinforcement upturn.

13 Claims, 3 Drawing Sheets

(56) References Cited

FOREIGN PATENT DOCUMENTS

| | | | |
|---|---|---|---|
| GB | 2 276 357 | | 9/1994 |
| JP | 08-40025 | | 2/1996 |
| JP | 2000-85319 | * | 3/2000 |
| JP | 2000-198326 | | 7/2000 |
| JP | 2005-205946 | | 8/2005 |

OTHER PUBLICATIONS

Machine translation of JP 2000-085319, 2000.*
Office Action dated Sep. 8, 2014 issued in the corresponding Japanese Patent Application No. 2012-543600.

* cited by examiner

TIRE BEAD FOR HEAVY CIVIL ENGINEERING VEHICLE

RELATED APPLICATIONS

This is a U.S. National Phase Application under 35 USC 371 of International Application PCT/EP2010/069080 filed on Dec. 7, 2010.

This application claims the priority of French Application No. 09/58993 filed Dec. 15, 2009, the entire content of which is hereby incorporated by reference.

The present invention relates to a radial tire designed to be fitted to a heavy vehicle of the civil engineering type.

Although not limited to this type of application, the invention will be more particularly described with reference to a radial tire designed to be fitted to a dumper, a vehicle for transporting materials extracted from quarries or from opencast mines. The nominal diameter of the rim of such a tire, within the meaning of the European Tire and Rim Technical Organisation or ETRTO standard, is equal to the minimum at 25".

BACKGROUND OF THE INVENTION

In the following, the following designations are used:

"Mid-plane": a plane containing the rotation axis of the tire.

"Equatorial plane": the plane passing through the middle of the tread surface of the tire and perpendicular to the rotation axis of the tire.

"Radial direction": a direction perpendicular to the rotation axis of the tire.

"Axial direction": a direction parallel to the rotation axis of the tire.

"Circumferential direction": a direction perpendicular to a mid-plane.

"Radial distance": a distance measured perpendicularly to the rotation axis of the tire and from the rotation axis of the tire.

"Axial distance": a distance measured parallel to the rotation axis of the tire and from the equatorial plane.

"Radially": in a radial direction.

"Axially": in an axial direction.

"Radially inner, respectively radially outer": of which the radial distance is lesser, respectively greater.

"Axially inner, respectively axially outer": of which the axial distance is lesser, respectively greater.

A tire comprises a tread designed to come into contact with the ground, two sidewalls extending radially inwards from the ends of the tread, and two beads extending the sidewalls radially inwards and providing the mechanical connection between the tire and the rim on which it is mounted.

A radial tire comprises more particularly a reinforcement element, comprising a crown reinforcement, radially inside the tread, and a carcass reinforcement, radially inside the crown reinforcement.

The carcass reinforcement of a radial tire for a heavy vehicle of the civil engineering type usually comprises at least one layer of carcass reinforcement consisting of metal reinforcement elements coated with a coating polymer material. The metal reinforcement elements of the carcass reinforcement layer are substantially parallel with one another and have a substantially radial direction, that is to say that they make, with the circumferential direction, an angle of between 85° and 95°.

The carcass reinforcement layer comprises a main carcass reinforcement portion, connecting the two beads together and winding in each bead, from the inside to the outside of the tire, around a bead wire core, in order to form a carcass reinforcement upturn extending radially outwards to a carcass reinforcement upturn end and comprising two respectively axially inner and axially outer carcass reinforcement upturn faces.

The bead wire core usually consists of a circumferential reinforcement element most frequently made of metal surrounded by at least one, nonexhaustively polymer or textile, material. The winding of the carcass reinforcement layer around the bead wire core, from the inside to the outside of the tire, and forming a carcass reinforcement upturn extending radially outwards, anchors the carcass reinforcement layer to the bead wire core of the bead.

The radial positioning of the carcass reinforcement upturn end is characterized by the carcass reinforcement upturn height which is the radial distance between the carcass reinforcement upturn end and the radially innermost point of the bead wire core. The carcass reinforcement upturn height determines the anchoring of the carcass reinforcement upturn in the polymer blends in contact respectively with the axially inner and axially outer carcass reinforcement upturn faces. The carcass reinforcement upturn height may be defined with the aid of a ratio relative to the radial distance between the radially outermost point of the tread and the radially innermost point of the bead.

"Axially inner carcass reinforcement upturn face" means the carcass reinforcement upturn face of which the external normal at any point of the said face has an axial component directed towards the inside of the tire. "Axially outer carcass reinforcement upturn face" means the carcass reinforcement upturn face of which the outer normal at any point of the said face has an axial component directed towards the outside of the tire.

The axially inner carcass reinforcement upturn face is in contact with a filling element radially extending the bead wire core outwards. The filling element has, in any mid-plane, a substantially triangular section and consists of at least one polymer filling material. The filling element may consist of a stack in the radial direction of at least two polymer filling materials in contact along a contact surface cutting any mid-plane along a meridian line. The filling element axially separates the main portion of carcass reinforcement and the carcass reinforcement upturn.

The axially outer carcass reinforcement upturn face is at least partly in contact with a stuffing element consisting of a polymer stuffing material. The stuffing element is axially inside the sidewall and a protective element radially extending the sidewall inwards, the sidewall and the protective element respectively consisting of a sidewall polymer blend and at least one protective polymer blend.

A polymer material, after curing, is characterized mechanically by characteristics of tensile stress-deformation determined by tension tests. These tension tests are carried out by those skilled in the art on a test specimen, according to a known method, for example according to international standard ISO 37, and in normal temperature conditions (23+ or −2° C.) and hygrometry conditions (50+ or −5% relative humidity), defined by international standard ISO 471. The modulus of elasticity at 10% elongation of a polymer blend, expressed in mega pascals (MPa), refers to the tensile stress measured for a 10% elongation of the test specimen.

A polymer material, after curing, is also characterized mechanically by its hardness. Hardness is notably defined by the Shore A hardness determined according to the standard ASTM D 2240-86.

When the vehicle is running, the tire, mounted on its rim, inflated and squashed under the weight of the vehicle, is subjected to flexing cycles, in particular at its beads and its sidewalls.

The flexing cycles cause variations of curvature combined with variations of tension of the metal reinforcement elements of the main carcass reinforcement portion and of the carcass reinforcement upturn.

For a tire with a carcass reinforcement upturn known as high, that is to say for which the carcass reinforcement height is at least equal to 0.3 times the radial distance between the radially outermost point of the tread and the radially innermost point of the bead, the flexing cycles in the sidewall cause the breakage of the metal reinforcement elements of the carcass reinforcement upturn portion situated in the flexing zone of the sidewall, capable of causing a deterioration of the tire over time requiring its replacement.

For a tire with a carcass reinforcement upturn known as low, that is to say for which the carcass reinforcement height is at most equal to 0.3 times the radial distance between the radially outermost point of the tread and the radially innermost point of the bead, the flexing cycles in the bead cause cracking of the polymer blends situated in the vicinity of the carcass reinforcement upturn end in a zone of high mechanical flexing and shearing stresses, capable of causing a deterioration of the tire over time requiring its replacement. This cracking phenomenon at the end of the carcass reinforcement upturn also exists, but to a lesser degree, in the case of a high carcass reinforcement upturn.

In the case of a tire with a high carcass reinforcement upturn, in order to prevent the problem of breakage of the metal reinforcement elements of the carcass reinforcement upturn portion, situated in the zone of flexing of the sidewall, those skilled in the art have proposed to reduce the height of the carcass reinforcement upturn in order to achieve a low carcass reinforcement upturn which is nevertheless sensitive to the cracking of the polymer blends, situated in the vicinity of the carcass reinforcement upturn end.

In the case of a tire with a low carcass reinforcement upturn, document EP 0736400 describes a solution for solving the problem of cracking of the polymer blends, situated in the vicinity of the carcass reinforcement upturn end, consisting in coating the carcass reinforcement upturn end with a polymer material absorbing the deformations of the polymer blends that are present in this zone.

SUMMARY OF THE INVENTION

One object of the invention is to improve the endurance of the beads of a radial tire for a heavy vehicle of the civil engineering type by blocking the cracks that are initiated in the carcass reinforcement upturn end zone and are propagated in the surrounding polymer materials, causing the deterioration of the bead over time.

This and other objects are attained in accordance with one aspect of the invention directed to a tire for a heavy vehicle of the civil engineering type comprising:
  a tread,
  two sidewalls extending radially inwards from the ends of the tread,
  two beads extending the sidewalls radially inwards and each comprising a bead wire core,
  a carcass reinforcement extending between the beads and comprising at least one carcass reinforcement layer metal reinforcement elements wound in each bead, from the inside to the outside of the tire, around the bead wire core, in order to form a carcass reinforcement upturn extending radially outwards to a carcass reinforcement upturn end, the carcass reinforcement upturn comprising two respectively axially inner and axially outer faces of carcass reinforcement upturn,
  a binding element, at least two binding layers reinforcement elements made of textile material, being in continuous contact with the carcass reinforcement upturn between a first point of contact on the axially inner face of carcass reinforcement upturn, corresponding to a first end of the binding element, and a last point of contact on the axially outer face of the carcass reinforcement upturn.

According to an embodiment of the invention, it is advantageous to have a binding element, comprising at least two binding layers having reinforcement elements made of textile material, in continuous contact with the carcass reinforcement upturn between a first point of contact on the axially inner face of carcass reinforcement upturn, corresponding to a first end of the binding element, and a last point of contact on the axially outer face of carcass reinforcement upturn.

The binding element, comprising at least two binding layers having reinforcement elements made of textile material, reduces the speed of propagation of the cracks initiated in the polymer materials in contact with the carcass reinforcement upturn end zone. The initiation of the cracks in the polymer materials in contact with the metal reinforcement elements results from initial defects of adhesion between the ends of the metal reinforcement elements and the polymer blends in contact. The propagation of the cracks depends on the stresses in the polymer materials that are present in the carcass reinforcement upturn end zone. The binding element, comprising at least two binding layers having reinforcement elements made of textile material, will on the one hand reduce the stresses and deformations in the coating blend at the end of the carcass reinforcement upturn, and on the other hand block the propagation of the cracks in the polymer materials situated on either side of the carcass reinforcement upturn. The presence of at least two superposed binding layers constitutes a set of successive barriers to the propagation of the cracks.

Moreover, a continuous contact with the carcass reinforcement upturn between a first point of contact on the axially inner carcass reinforcement upturn face, corresponding to a first end of the binding element, and a last point of contact on the axially outer carcass reinforcement upturn face makes it possible to ensure the effect of slowing the cracking both on the axially inner face and axially outer face portions of the carcass reinforcement upturn.

It is also advantageous that the distance between the first point of contact on the axially inner face of carcass reinforcement upturn, corresponding to a first end of the binding element, and the end of carcass reinforcement upturn is at least equal to 5 times the diameter of a reinforcement element of the carcass reinforcement layer. This minimum contact distance ensures adhesion between the binding element and the axially inner carcass reinforcement upturn face. Below this minimum contact distance, there is a risk of the binding element coming unstuck, by an elastic return effect, because of the closeness of the carcass reinforcement upturn end around which the binding element is folded.

It is also advantageous to have the distance between the first point of contact on the axially inner face of carcass reinforcement upturn, corresponding to a first end of the binding element, and the end of carcass reinforcement upturn at most equal to 10 times the diameter of a reinforcement element of the carcass reinforcement layer. This maximum contact distance ensures that the portion of axially inner carcass reinforcement upturn face sensitive to cracking is covered. Beyond this maximum contact distance, the risk of cracking being less, the binding element becomes unnecessary with respect to the cracking while causing an additional cost of polymer material.

One advantageous embodiment of the invention is to have the last point of contact on the axially outer face of carcass reinforcement upturn corresponding to a second end of the binding element. This feature means that the second end of the element is necessarily in contact with the axially outer carcass reinforcement upturn face, the said face being, by convention, between the radially innermost point of the carcass reinforcement layer, radially inside the bead wire core, and the carcass reinforcement upturn end. In these conditions, the binding element is not engaged beneath the bead wire core.

It is also advantageous to have the distance between the last point of contact on the axially outer face of carcass reinforcement upturn, corresponding to the second end of the binding element, and the end of carcass reinforcement upturn at least equal to 10 times the diameter of a reinforcement element of the carcass reinforcement layer. As for the contact of the binding element with the axially inner carcass reinforcement upturn face, this minimum contact distance ensures adhesion between the binding element and the axially outer carcass reinforcement upturn face. Below this minimum contact distance, there is a risk of the binding element coming unstuck, through an effect of elastic return, because of the closeness of the carcass reinforcement upturn end around which the binding element is folded.

It is also advantageous to have the distance between the last point of contact on the axially outer face of carcass reinforcement upturn, corresponding to the second end of the binding element, and the end of carcass reinforcement upturn at most equal to 20 times the diameter of a reinforcement element of the carcass reinforcement layer. This maximum contact distance ensures that the portion of axially outer carcass reinforcement upturn face sensitive to cracking is covered. Beyond this maximum contact distance, the binding element becomes unnecessary with respect to the cracking while causing an additional cost of polymer material.

One advantageous embodiment is to have the thickness of the binding element at least equal to 0.2 times the diameter of a reinforcement element of the carcass reinforcement layer. This is the minimum thickness necessary for ensuring a robust binding, that is to say making it possible to prevent the ends of the metal reinforcement elements of the carcass reinforcement upturn from entering the binding element and consequently damaging it.

Another advantageous embodiment is to have the thickness of the binding element at most equal to 0.6 times the diameter of a reinforcement element of the carcass reinforcement layer. Above this thickness, the folding of the binding element around the carcass reinforcement upturn end is difficult to achieve and is likely to cause manufacturing defects that may lead to the deterioration of the tire in use.

It is advantageous that the binding element consists of two binding layers, consisting of reinforcement elements made of textile material, and that the reinforcement elements of one and the same binding layer, substantially parallel with one another, form a non-zero angle relative to the radial direction and are crossed relative to the reinforcement elements of the other binding layer. The two binding layers of which the reinforcement elements made of textile material are crossed from one binding layer to the other thus constitute a fabric of which the weft provides a triangulation effect limiting the deformations in the polymer blend for coating the substantially radial metal reinforcement elements of the carcass reinforcement upturn: which slows down the propagation of the cracks initiated on the carcass reinforcement upturn.

The angles of the reinforcement elements respectively of the two binding layers of the binding element are advantageously equal to one another, in absolute value, and at least equal to 45°, relative to the circumferential direction. The angles being equal makes it possible to simplify manufacture since the respective angles of the reinforcement elements of the binding layers are identical except for the sign. The inventors have shown that an angle of at least 45°, relative to the circumferential direction, makes it possible to provide an optimal triangulation at the carcass reinforcement upturn end.

The angles of the reinforcement elements respectively of the two binding layers of the binding element are also advantageously at most equal to 80°, relative to the circumferential direction. Beyond an angle of 80°, there is no further triangulation effect because the reinforcement elements of the binding layers are then substantially parallel to the reinforcement elements of the carcass reinforcement upturn of which the angle relative to the circumferential direction is between 85° and 95°.

It is advantageous to have the reinforcement elements of the two binding layers of the binding element made of material of the aliphatic polyamide type, because this type of material ensures a slight flexing rigidity of the binding element allowing the binding element to fold around the carcass reinforcement upturn end and ensures a good resistance to compression of the reinforcement elements.

A preferred embodiment is to have the radial distance between the end of carcass reinforcement upturn and the radially innermost point of the bead wire core at most equal to 0.3 times the radial distance between the radially outermost point of the tread of the tire and the radially innermost point of the bead of the tire. This is the characteristic of a carcass reinforcement upturn known to be low, for which cracking at the end of the carcass reinforcement upturn is particularly sensitive and for which the binding element provides a significant advantage.

BRIEF DESCRIPTION OF THE DRAWINGS

The features of the invention will be better understood with the aid of the description of the appended FIGS. 1 to 3:

FIGS. 1 to 3 are not shown to scale in order to make understanding easier.

DETAILED DESCRIPTION OF THE INVENTION

Figure 1:
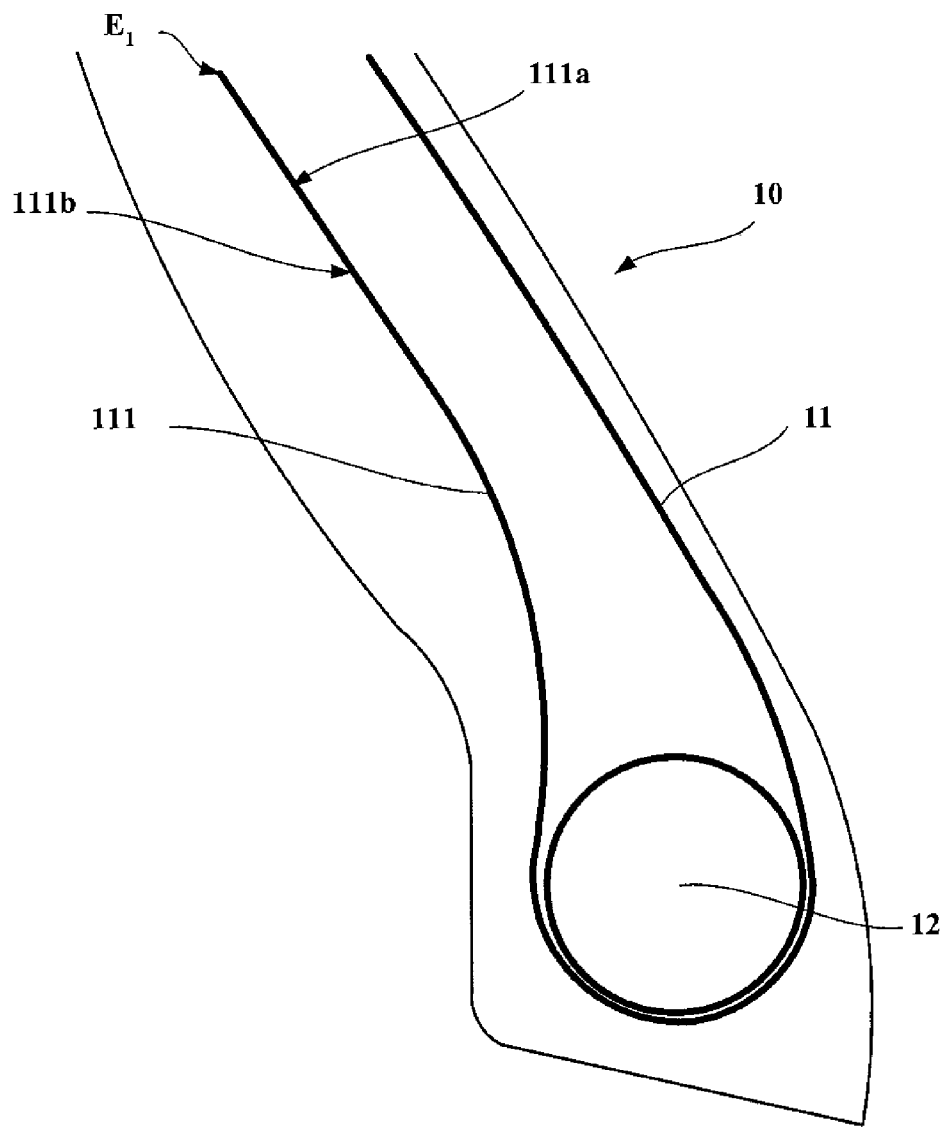
FIG. 1 shows a view in section in a mid-plane of the bead of a tire for a heavy vehicle of the civil engineering type of the prior art.

FIG. 1 shows a tire bead 10 for a heavy vehicle of the civil engineering type of the prior art, comprising a carcass reinforcement comprising at least one carcass reinforcement layer 11 consisting of metal reinforcement elements winding, from the inside to the outside of the tire, around a bead wire core I2, in order to form a carcass reinforcement upturn 111 extending radially outwards to a carcass reinforcement upturn end $E_1$, the carcass reinforcement upturn comprising two carcass reinforcement upturn faces respectively an axially inner face 111a and an axially outer face 111b.

Figure 2:
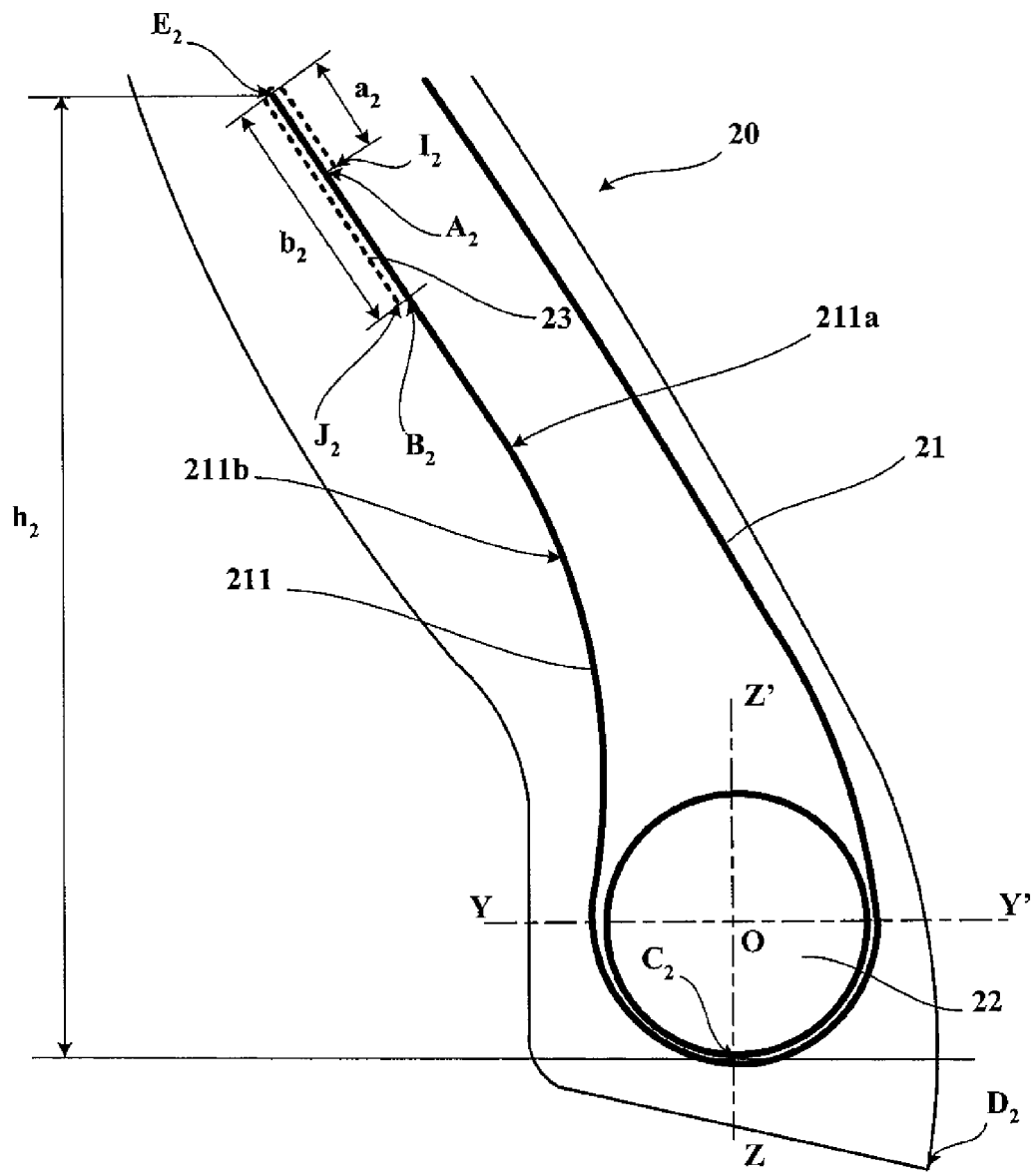
FIG. 2 shows a view in section in a mid-plane of the bead of a tire for a heavy vehicle of the civil engineering type, according to a first embodiment of the invention.

FIG. 2, showing a first embodiment of the invention, shows a tire bead 20 for a heavy vehicle of the civil engineering type, comprising a carcass reinforcement comprising at least one carcass reinforcement layer 21 consisting of metal reinforcement elements winding, from the inside to the outside of the tire, around a bead wire core 22, in order to form a carcass reinforcement upturn 211 extending radially outwards to a carcass reinforcement upturn end $E_2$, the carcass reinforcement upturn comprising two carcass reinforcement upturn faces, respectively an axially inner face 211a and an axially outer face 211b.

A binding element 23, comprised of at least one binding layer reinforcement elements made of textile material, is in continuous contact with the carcass reinforcement upturn 211, between a first point of contact A2 on the axially inner carcass reinforcement upturn face 211a, corresponding to a first end I2 of the binding element, and a last point of contact B2 on the axially outer carcass reinforcement upturn face 211b, corresponding to a second end J2 of the binding element.

The distances $a_2$ and $b_2$ are the distances measured respectively between the first point of contact $A_2$ on the axially inner face 211a of carcass reinforcement upturn 211 and the carcass reinforcement upturn end $E_2$, and between the last point of contact $B_2$ on the axially outer face 211b of carcass reinforcement upturn 211 and the carcass reinforcement upturn end $E_2$.

The distance $h_2$ is the distance measured parallel to the radial direction ZZ' between the end $E_2$ of carcass reinforcement upturn 211 and the radially innermost point $C_2$ of the bead wire core 22. This distance may be expressed as a ratio of the radial distance between the radially outermost point of the tire tread, not shown, and the radially innermost point $D_2$ of the tire bead 20.

Figure 3:
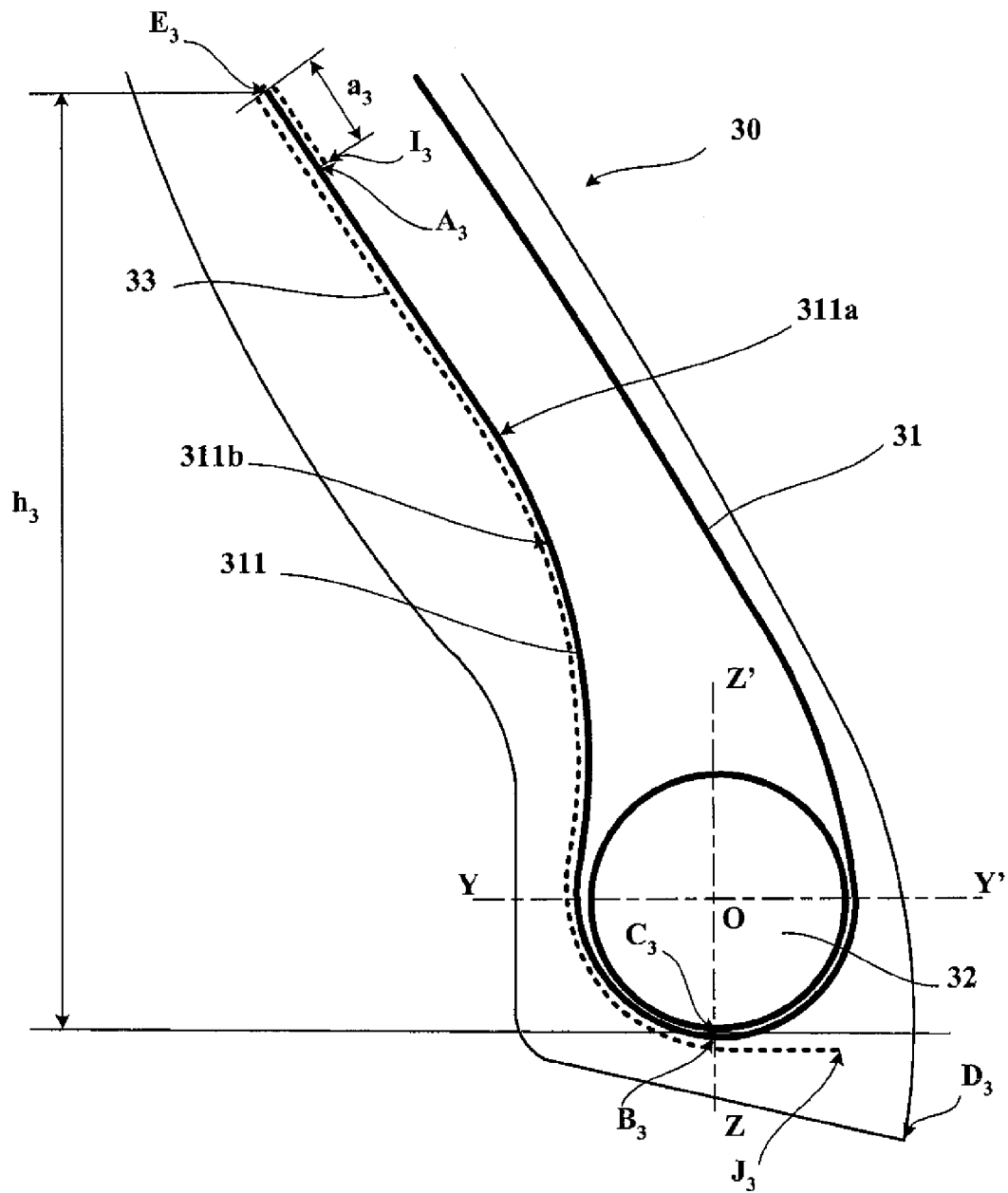
FIG. 3 shows a view in section in a mid-plane of the bead of a tire for a heavy vehicle of the civil engineering type, according to a second embodiment of the invention.

FIG. 3, showing a second embodiment of the invention, shows a tire bead 30 for a heavy vehicle of the civil engineering type, comprising a carcass reinforcement comprising at least one carcass reinforcement layer 31 comprised of metal reinforcement elements winding, from the inside to the outside of the tire, around a bead wire core 32, in order to form a carcass reinforcement upturn 311 extending radially outwards to a carcass reinforcement upturn end E3, the carcass reinforcement upturn comprising two carcass reinforcement upturn faces, respectively an axially inner face 311a and an axially outer face 311b.

A binding element 33, consisting of at least one binding layer consisting of reinforcement elements made of textile material, is in continuous contact with the carcass reinforcement upturn 311, between a first point of contact $A_3$ on the axially inner carcass reinforcement upturn face 311a, corresponding to a first end $I_3$ of the binding element, and a last point of contact $B_3$ on the axially outer carcass reinforcement upturn face 311b, but not corresponding to a second end $J_3$ of the binding element. This embodiment provides an improvement with respect to the risk of a lack of cohesion between the blend for coating the axially outer face of the carcass reinforcement upturn and the polymer blend in contact. In this embodiment, a portion of the binding element 33, axially inside the radial axis ZZ' passing through the centre of the bead wire core, is no longer in contact with the axially outer carcass reinforcement upturn face 311b: the binding element 33 is said to be engaged beneath the bead wire core 32.

The distance $a_3$ is the distance measured between the first point of contact $A_3$ on the axially inner face 311a carcass reinforcement upturn 311 and the end $E_3$.

The distance $h_3$ is the distance measured parallel to the radial direction ZZ' between the end $E_3$ of carcass reinforcement upturn 311 and the radially innermost point $C_3$ of the bead wire core 32. This distance can be expressed as a ratio of the radial distance between the radially outermost point of the tire tread, not shown, and the radially innermost point $D_3$ of the tire bead 30.

The invention has been studied more particularly in the case of a tire of dimension 59/80R63 for a heavy vehicle of the dumper type. According to the ETRTO standard, the nominal conditions of use for such a tire are an inflation pressure equal to 6 bar, a static load equal to 99 tonnes and a distance traveled in an hour of between 16 km and 32 km.

The 59/80R63 tire has been designed according to the first embodiment as shown in FIG. 2.

In the example studied, the distance $a_2$ between the first point of contact $A_2$ on the axially inner face 211a of carcass reinforcement upturn 211, corresponding to a first end $I_2$ of the binding element 23 and the carcass reinforcement upturn end $E_2$ is equal to 35 mm, namely approximately 8 times the diameter of a reinforcement element of the carcass reinforcement layer equal to 4.5 mm.

The distance $b_2$ between the last point of contact $B_2$ on the axially outer face 211b of carcass reinforcement upturn 211, corresponding to a second end $J_2$ of the binding element 23 and the carcass reinforcement upturn end $E_2$ is equal to 70 mm, namely approximately 16 times the diameter of a reinforcement element of the carcass reinforcement layer equal to 4.5 mm.

The binding element 23 consists of two binding layers with a thickness equal to 0.8 mm. The thickness e of the binding element 23 is equal to 2 times the thickness of a binding layer, namely 1.6 mm, which represents 0.35 times the diameter of a reinforcement element of the carcass reinforcement layer equal to 4.5 mm.

The respective angles of the reinforcement elements of the binding layers are equal to +80° and −80° relative to the circumferential direction.

The material constituting the reinforcement elements of the binding element is a nylon, that is to say a material of the aliphatic polyamide type.

Finally, the radial distance $h_2$ between the end $E_2$ of carcass reinforcement upturn 211 and the radially innermost point $C_2$ of the bead wire core 22 is equal to 270 mm, which represents a ratio of 0.22 relative to the radial distance between the radially outermost point of the tire tread and the radially innermost point $D_2$ of the tire bead 20, equal in the case studied to 1240 mm.

The computation simulations by finished elements, carried out on the study tire of dimension 59/80R63, show a 40% reduction in the maximum shearing deformations in the coating blend of the carcass reinforcement upturn, between the metal reinforcement elements of the carcass reinforcement upturn, when changing from the reference tire to the tire according to the invention as shown in FIG. 2.

The invention should not be interpreted as being limited to the example illustrated in FIG. 2, but may be extended to other variant embodiments characterized, for example and in a non-exhaustive manner, by a number of binding layers of the binding element greater than two, reinforcement elements of the binding layers of the binding element consisting of a material different from one layer to the other, etc.

The invention claimed is:

1. A tire for a heavy vehicle of the civil engineering type comprising:
  a tread;
  a sidewall extending radially inwards from an end of said tread;
  a bead extending said sidewall radially inwards, said bead comprising a bead wire core; and a carcass reinforcement comprising at least one carcass reinforcement layer having metal reinforcement elements wound in said bead, from the inside to the outside of the tire, around said bead wire core, in order to form a carcass reinforcement upturn extending radially outwards to a carcass reinforcement upturn end, said carcass reinforcement upturn comprising an axially inner face and an axially outer face, wherein a binding element, having at least two binding layers comprised of reinforcement elements made of textile material, is in continuous contact with said carcass reinforcement upturn between a first point of contact on said axially inner face of said carcass reinforcement upturn, corresponding to a first end of said binding element, and a last point of contact on said axially outer face of carcass reinforcement upturn, and wherein:

a portion of said binding element that includes a second end of said binding element extends axially inside a radial axis passing through the center of the bead wire core, the portion of said binding element extends axially inside the last point of contact, and the portion of said binding element is not in contact with said axially outer face of said carcass reinforcement upturn.

2. The tire for a heavy vehicle of the civil engineering type according to claim 1, wherein the distance between said first point of contact on said axially inner face of carcass reinforcement upturn, corresponding to a first end of said binding element, and said end of carcass reinforcement upturn is at least equal to 5 times the diameter of a reinforcement element of said carcass reinforcement layer.

3. The tire for a heavy vehicle of the civil engineering type according to claim 1, wherein the distance between said first point of contact on said axially inner face of carcass reinforcement upturn, corresponding to a first end of said binding element, and said end of carcass reinforcement upturn is at most equal to 10 times the diameter of a reinforcement element of said carcass reinforcement layer.

4. The tire for a heavy vehicle of the civil engineering type according to claim 1, wherein said last point of contact on said axially outer face of carcass reinforcement upturn corresponds to a second end of said binding element.

5. The tire for a heavy vehicle of the civil engineering type according to claim 1, wherein the distance between said last point of contact on said axially outer face of carcass reinforcement upturn, corresponding to a second end of said binding element, and said end of carcass reinforcement upturn is at least equal to 10 times the diameter of a reinforcement element of said carcass reinforcement layer.

6. The tire for a heavy vehicle of the civil engineering type according to claim 1, wherein the distance between said last point of contact on said axially outer face of carcass reinforcement upturn, corresponding to a second end of said binding element, and said end of carcass reinforcement upturn is at most equal to 20 times the diameter of a reinforcement element of said carcass reinforcement layer.

7. The tire for a heavy vehicle of the civil engineering type according to claim 1, wherein the thickness of said binding element is at least equal to 0.2 times the diameter of a reinforcement element of said carcass reinforcement layer.

8. The tire for a heavy vehicle of the civil engineering type according to claim 1, wherein the thickness of said binding element is at most equal to 0.6 times the diameter of a reinforcement element of said carcass reinforcement layer.

9. The tire for a heavy vehicle of the civil engineering type according to claim 1, wherein said binding element includes two binding layers having reinforcement elements made of textile material, and wherein said reinforcement elements of one and the same binding layer, substantially parallel with one another, form a non-zero angle relative to the radial direction and are crossed relative to said reinforcement elements of the other binding layer.

10. The tire for a heavy vehicle of the civil engineering type according to claim 9, wherein the angles of said reinforcement elements respectively of said two binding layers of said binding element are equal to one another, in absolute value, and at least equal to 45°, relative to the circumferential direction.

11. The tire for a heavy vehicle of the civil engineering type according to claim 10, wherein the angles of said reinforcement elements respectively of said two binding layers of said binding element are at most equal to 80°, relative to the circumferential direction.

12. The tire for a heavy vehicle of the civil engineering type according to claim 1, wherein said reinforcement elements of said two binding layers of said binding element are made of material of an aliphatic polyamide type.

13. The tire for a heavy vehicle of the civil engineering type according to claim 1, wherein the radial distance between said end of carcass reinforcement upturn and said radially innermost point of said bead wire core is at most equal to 0.3 times the radial distance between said radially outermost point of said tread of the tire and said radially innermost point of said two beads of the tire.

* * * * *